United States Patent [19]

Vinberg et al.

[11] Patent Number: 4,852,019
[45] Date of Patent: Jul. 25, 1989

[54] METHOD AND SYSTEM FOR RETRIEVAL OF STORED GRAPHS

[75] Inventors: Anders B. Vinberg, Del Mar; Thomas J. Wright, San Diego; Kenneth A. Lehman, San Diego, all of Calif.

[73] Assignee: Computer Associates International, Inc., Garden City, N.Y.

[21] Appl. No.: 825,081

[22] Filed: Jan. 31, 1986

[51] Int. Cl.⁴ .......................... G06F 15/62; G06F 3/14
[52] U.S. Cl. .................................. 364/521; 340/703; 340/721; 364/520
[58] Field of Search .............................. 364/518–521, 364/512, 520, 519; 340/750, 734, 798–800, 703, 721, 723

[56] References Cited

U.S. PATENT DOCUMENTS

| | | | |
|---|---|---|---|
| 3,921,148 | 11/1975 | Ophir et al. | 364/900 |
| 4,231,087 | 10/1980 | Hunsberger et al. | 364/200 |
| 4,365,293 | 12/1982 | Holtz | 364/200 |
| 4,551,810 | 11/1985 | Levine | 364/512 |
| 4,555,775 | 11/1985 | Pike | 364/900 |
| 4,559,533 | 12/1985 | Bass et al. | 340/724 |
| 4,611,306 | 9/1986 | Crehan et al. | 364/521 X |
| 4,620,289 | 10/1986 | Chauvel | 364/521 |
| 4,622,546 | 11/1986 | Sfarti et al. | 340/799 X |
| 4,633,506 | 12/1986 | Kato | 340/799 X |
| 4,660,029 | 4/1987 | Houda et al. | 364/521 X |
| 4,665,555 | 5/1987 | Alker et al. | 382/41 |
| 4,748,442 | 5/1988 | Allaire | 340/799 X |
| 4,800,510 | 1/1959 | Vinberg et al. | 364/521 |

FOREIGN PATENT DOCUMENTS

81/00989 3/1982 PCT Int'l Appl. .

Primary Examiner—Gary V. Harkcom
Assistant Examiner—H. R. Herndon
Attorney, Agent, or Firm—Weil, Gotshal & Manges

[57] ABSTRACT

Automation of retrieval of stored graphs in a multi-user system having a central processing facility with processes that create and translate graphical representation into varying levels of readable expression. The created, translated representations are stored in system storage in the form of graph files. The invention is expressed as a method that tabularizes stored graph files by table entries, each identifying a specific graph and including a listing of the corresponding graph files produced for the graph. When a user of the system identifies a graph by table entry and specifies a machine output or modification function to be performed on the identified graph, the tabularized entries are searched to locate an entry for the identified graph. Once the correct table entry is found, the graph file listing is searched according to a user-specified representation preference ordering in the form of a priority schedule to determine whether a specified output function can be performed with any of the stored graph files stored for the identified graph. If a match is found between one of the representations stored for the graph and one of the representations in the priority schedule, the matched file is retrieved from storage and translated to the level required for the function. The translated file is then dispatched to a graphical output device for performance of the function.

12 Claims, 10 Drawing Sheets

GRAPH DIRECTORY

| ID | DESCRIPTION | COMMENTS | FILE LEVEL | NAME | DATE |
|----|-------------|----------|------------|------|------|
|    |             |          | S          |      |      |
|    |             |          | M          |      |      |
|    |             |          | DS         |      |      |

USER N FUNCTION LIST

| FUNCTION | DEVICE | LOCATION | GRAPH | LAYOUT | FUNCTION PRIORITY SCHEDULE |
|----------|--------|----------|-------|--------|---------------------------|
| VIEW     | TERMINAL |        |       |        | DS, M |
| HARDCOPY | PRINTER |         |       |        |       |
|          | PLOTTER |         |       |        |       |
|          | •       |         |       |        |       |
|          | •       |         |       |        |       |
|          | •       |         |       |        |       |
| EDIT     | TERMINAL |        |       |        |       |

FIG. 3B

METHOD AND SYSTEM FOR RETRIEVAL OF STORED GRAPHS

BACKGROUND OF THE INVENTION

The invention relates to a new method and system for retrieving stored graph representations according to a specified representation preference order. More specifically, it relates to retrieval of stored graph representations according to a procedure which seeks to select one of the available representations of an identified graph according to a representation level in a priority schedule of representation levels.

The invention operates in the environment of a general purpose computer connected through a communications system including plural communication channels that provide data interchange capability between the computer and a plurality of user terminals and a plurality of output devices. A user terminal is understood to refer to a typical terminal device including a keyboard, a display, and a limited computation facility, possibly together with one or more graphical output devices. Since a terminal normally includes a CRT having the capability to provide a visual output, terminal CRT's are included in the category of devices referred to as output devices.

In this document, a "graph" is any kind of pictorial representation including one or more symbols. As is known, graphs include but are not limited to: line charts, area charts, scattergrams, horizontal and vertical bar charts, pie charts, maps, tables, text pages, and other text displays, lists, and symbol diagrams, and combinations of these. A graphical output device is a computer controlled device capable of producing a visual image of a graph.

Existing graphics application programs, together with other prior art computer programs, are available to operate on the computer to create graphs in response to commands, parameters, and data received from users through the terminals communicatively connected to the computer or retrieved from data files or databases. Created graphs are dispatched by transmission of graphical data from the computer to the output devices. A graph is output when a visual representation of its image is produced either on a screen or a hardcopy medium such as paper or photographic slide material at an output device.

Typically, in the posited multi-user scenario, a number of terminals share the computer, using it simultaneously to do different things with it. In the situation of interest, the system is employed for the creation of graphs for end users. End use of a graph can involve the satisfaction of a plethora of user needs; for example, different users may retrieve a graph for viewing, printing, or alteration.

As is known, the levels of representation of a graph, also called levels of abstraction, correspond generally to the position between human understandability and machine understandability occupied by the expression of the graph. Thus, at the highest level of abstraction, graphs are represented by human language descriptions. At the lowest level of abstraction, the graph is expressed in a machine-language format that can be comprehended only by the device upon which the graph is to be produced. At an intermediate level graphs can be represented by a string of graphics primitives consisting of straightforward figure elements such as lines, polygons, circles, ellipses, circle segments, text, and filled polygons. Such strings also include graphics attributes which further modify the graphics primitives. The attributes include location coordinates, size, color, and typeface. The highest expression of a graph in human understandable form is referred to as a source file; an intermediate level representation is termed a metafile; while the lowest level of abstraction is a device specific file. It is to be understood that the term "metafile" is an accepted label for a particular kind of intermediate level expression. Other expressions, at different levels of abstraction than metafile, may also exist between source and device-specific files.

Characteristically, once a graph is created it will be expressed in one or more levels of abstraction in order to support certain functions. Functions are human initiated machine performances of particular work on a graph to achieve a definite purpose. For the purposes of this application, it is understood that processes exist which translate the expression of a graphical image at one level to an equivalent expression at a lower level.

As is known, the different uses to which a graph is put require that the machine understandable image representation of the graph be available at differing levels of machine abstraction. For example, in text processing the terms "final form" and "revisable form" are used to indicate two different levels of abstraction, each particularly designed for a specific function: the final form is that to be printed or viewed only, the revisable form is intended to be changed prior to printing. In graphics, there are more than just these two levels: the graph representation corresponding to the final form of text may be more or less tailored to the output processor of a certain graphical output device; and the revisable form, having a representation in a higher level of abstraction than the final form, may allow different kinds of revision to the graph.

The different kinds of graph representations imply different performance requirements for the centrally-operated graphical production system. Some representations provide cheap retrieval of a graph but limited flexibility in terms of choice of output device or modification. Other representations are flexible in terms of being adaptable to a variety of output devices, however, their maintenance, retrieval, and translation usually entail a high cost.

An archival problem in a centrally organized graphic system is characterized by the interplay of desired function and graphical representations. For example, retrieval of a graph image from storage for viewing on a CRT is most quickly accomplished and requires the least amount of computer processing if the graph is stored in the lowest level representation possible. For a CRT this would consist of the actual bit map of the graph's image or a device instruction stream convertible to a bit map. The bit map or instruction stream is easily retrieved from storage and formatted for transmission through a communications channel to the output device by conversion to a bit or byte sequence that is transmitted through the communications channel to the output device. This lowest-level representation requires no computer processing of the stored information but only transmission of the data to the graphics device.

Any higher level of representation, such as metafile format, would require additional processing for translation of the metafile to the bit map or instruction stream required by the device. However, if all graphs were represented in their lowest level of abstraction, the variety of output devices would proliferate the device specific files, since different output devices require different information. Therefore, support of several different output devices with a single device specific representation would not be possible. As the output device configurations multiply, so do the device specific representations of each graph. As the number of representations grows and is multiplied by the number of graphs, one can appreciate that the storage requirements of the centrally organized system increase correspondingly. Moreover, system operating costs are increased because of the processing cost of creating all of the files, and because of the administrative difficulty in keeping the different representations coordinated.

From the user standpoint, another disadvantage of device specific file storage is that the low level expression of a graph is very difficult to modify. Modification of a graph at this level of representation requires access to the graph figure elements, which are nothing more than patterns of bits in the device data stream. Therefore, a user would naturally seek a higher level of graph representation for purposes of modification.

Storage of graphs in representations at a higher level than device-specific (such as metafiles) requires processing of the representations to translate the representations to lower-level expressions. This processing increases the cost of sending the graph to an output device, but has the fundamental advantage that one representation is sufficient to handle a great number of devices.

However, metafile storage also has disadvantages. Storage of graphs in the form of metafiles brings diminishing reward if the ambition of a system is to support all different classes of output devices. As is known, groups or families of devices provided by specific manufacturers are often characterized in having processing or operational characteristics which are reduced to a set of fundamental primitive expressions that do not support the operations of other families of devices. In this case, more sophistication would be required in processing, increasing the complexity of the translation task and nullifying to a great extent the efficiencies that can be achieved with metafile expression storage.

Another disadvantage of metafile representation is that the original graph creation process, when operated to create a metafile, is unaware of the intended output device and thus cannot apply a procedure that optimizes the graphical layout to the output device characteristics. Translation of a device. independent metafile to a device-specific representation can result in a graph having an appearance of a lower quality than a graph designed with the attributes of the output device in mind. Such a process can be understood by reference to U.S. patent application No. 761,182, filed July 31, 1985 now U.S. Pat. No. 4,800,510, which is assigned to the assignee of the present invention, and which is incorporated herein by reference.

The process of adapting a graph to the characteristics of a specific output device requires the ability to modify the graph in non-geometric ways. This is possible only if the graph is described in very high level terms: the title, the axis scaling, and the legend annotation, for example, all need to be recognized as such to be modifiable in a graphically intelligent manner. The axis scale annotation, for example, cannot be modified intelligently if the text is known only as arbitrary text strings, as it would be in a metafile representation. This high level representation (source file) contains specifications such as graph type, graph data, annotation, etc. A source file is in effect an English language description of a graph, even though the actual format of the file may be more technical; it is often created by a human being and is most often human-readable. A straightforward translation of the human readable graph description into some high level internal data structure for use by a graph creation program in recreating the graph is referred to as a graph specification file. Although not all graph creation systems recognize the existence of this file, the "parsing" of user-entered specification usually creates this data structure at some point in a graph creation process. For the purposes of this description, graph specification files are considered equivalent to source files in terms of their capabilities of being processed.

It is also recognized that the creator of the graph may not be aware of the source file as a file. If the graph is created through an interactive command or natural language process, through a terminal screen oriented forms fill in system, or through an icon-based mouse driven system, the source file is not visible to the user. However, most systems provide for storage of the graph specification at a level equivalent to a source file, perhaps in the form of a graph specification file as discussed above and this representation is considered equivalent to source files in terms of their capabilities of being processed.

It should be evident that storage of graphs in the very high level representation corresponding to a source file offers great flexibility to a centralized graph creation system and permits intelligent handling of modifications to the graph. However, translation of a source file into a usable representation requires the provision of a substantial amount of sophisticated processing resources. Retrieval of a graph stored in source file representation for output on a specific device becomes equivalent to the creation of the graph, requiring a large amount of processing power and time. However, such high level representations are very compact for storage and require very little processing to create.

It will be appreciated from the preceding discussion that the problem of creating a graphical archive to serve the needs of many users requiring access to many graphs which are to be produced on a variety of output devices demands a flexible system permitting the storage of graphs in a variety of representational levels which can be retrieved quickly and efficiently. The provision for storage of a plurality of representational levels permits the system to be adapted to the specific functional needs of particular graph image applications, while the feature of rapid retrieval heightens the responsivity of the system to user needs.

Therefore, it is a primary objective of the subject invention to provide an archive system supporting the maintenance of graphs in a plurality of representations that reduces the system resources and operations required to store, retrieve, and produce a graph.

SUMMARY OF THE INVENTION

The invention is based upon the critical observation that in a graphical archiving system the strategy for retrieving a particular stored representation of a graph can take into account the function intended to be performed on the retrieved image.

The invention is embodied in a method for retrieval of stored graph representations in a centralized system including a central computing facility, software processes in the computing facility for creating graphs in response to user-provided specifications, for translating created graphs to lower levels of representation, and for storing graph representations, and a plurality of user terminal facilities and graphical output devices communicatively linked to exchange data with the computing facility. Each user facility includes one or more graph output devices that respond to graph representations by producing visible images of graphs. Within this specified system context, the method includes creation of a graph in source file format. Specified graph files of created graphs are produced in predetermined levels of machine-readable expression by translating the source files of the created graphs. Next, an archive of created graphs is assembled in which the graphs are tabularized and stored by table entries, with each table entry including identification of a specific graph and a listing of all graph files produced and stored for the identified graph. Thus organized, the archive serves a useful purpose by receiving user generated requests identifying graphs and specifying machine output functions or modification functions to which a requested graph is to be subjected. The method searches the tabularized entries for an entry corresponding to a user requested graph. If the entry is found, the method searches the listed graph files according to a predetermined priority schedule to determine whether a specified output function can be performed by any of the graph files listed for the requested graph. If a table entry graph file included in the priority schedule is found in the listing, the file is translated to the level required for the specified function and dispatched to the process corresponding to the function.

The system of the invention includes a central computing facility having processes for creating a graph file in source format; processes for producing specified graph files of created graphs in predetermined levels of machine readable expressions by translating the source files of created graphs; and processes for storing graph representations. A data management and storage facility tabularizes and stores the created graphs by table entries, with the facility able to construct a directory by producing a table entry for each created graph, which includes identification of the graph and a listing of the graph files produced and stored for the identified graph. A plurality of user terminals are communicatively linked to the central computing facility and permit a user to generate requests for graphs and to specify machine output functions or modification functions to which a requested graph is to be subjected. A process resource at the central computing facility receives user-generated requests and searches tabularized entries for a table entry corresponding to a user requested graph and determines, according to a predetermined priority schedule, whether a specified output function can be performed using any of the graph image files produced for the requested graph. Once the process resource finds a file included in the determined priority schedule, the found file is translated to the level required to support the specified function and the translated file is forwarded to the user.

Therefore, the summarized method and system permit the user of a graph creation system to realize the stated objective of the invention by creating graph files capable of supporting anticipated graph output requirements and employing the invention to make the allocation of system storage and processing resources best suited to the user's particular needs.

The invention not only meets the stated objective but also provides other advantages and efficiencies which will become more apparent when the following description of the invention.

BRIEF DESCRIPTION OF THE DRAWINGS

FIG. 3A is an illustration representing the tabularization of created graphs by table entry.

FIG. 3B illustrates the tabularization of graphical output devices allocated to a user by entries identifying a device and associating a preferred file class priority with each device.

DETAILED DESCRIPTION OF THE PREFERRED EMBODIMENT

Figure 1:
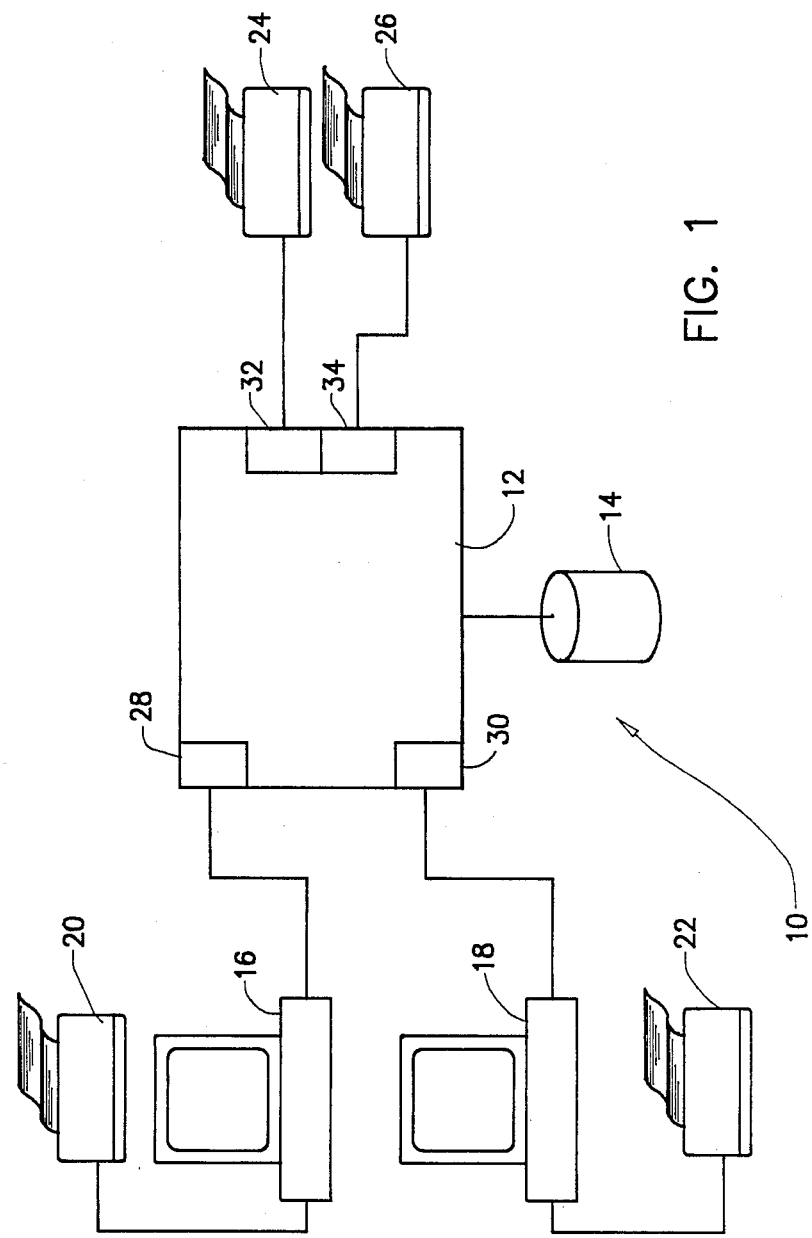
FIG. 1 is a block diagram of a multi-user graph creation system in which graph creation resources are allocated to a central processing facility.

A general purpose computer graphics system representing the operational environment of the invention is illustrated in FIG. 1. In FIG. 1 a central computing facility 10 includes a general purpose computer 12 and an on line storage facility 14. The computer 12 includes software that implements graphics application and graphics production programs. As is known, graphics application and production processes respond to commands, parameters, and data specified by the creator of a graph to produce graphs on one or more output devices. User access to the centralized system 10 is had through a plurality of remote terminals such as the terminals 16 and 18.

The terminals 16 and 18 are conventional data entry and monitor apparatus, each having an alphanumeric keyboard for entry of data, commands, parameters, and responses to system-generated prompts. It is understood that other methods of data entry such as graphical input devices (cursor, mouse, etc.) may also be employed by a user. Each of the terminals 16 and 18 includes a CRT display on which information from the central facility 10 can be provided to the user. The CRT permits a user to interact with the processes in the computer 12 by displaying function menus, requests for action or information, or other prompts generated by the processes, as well as representations of graphs. Graphs are also produced on hardcopy devices 20 and 22. As used in this description, the term "hardcopy device" means any computer controlled device capable of producing a graph on paper or any other permanent hardcopy medium. Hardcopy devices can include, for example, plotters, printers, and film recorders. The hardcopy devices 20 and 22 are linked to the central system 10 through the terminals 16 and 18, respectively. It is also the case that hardcopy devices 24 and 26 can be linked directly to the facility 10.

When output devices such as devices 24 and 26 are involved in the operation of the invention, it is understood that their locations can be specified by a user through a terminal such as terminals 16 and 18. The user can, in specifying one or more directly linked output devices and their locations, cause the computer 12 to dispatch graph files for output on the devices.

Furthermore, it is to be understood that a user, employing a terminal, can invoke the invention and have a graph file delivered for entry into a transportable storage medium. The medium can then be carried to an off line output device and used by the device to produce a graph image.

Communications between the central facility 10 and terminals or output devices are effected through communications controllers 28–34, which can comprise I/O communications processes in the computer 12 or discrete communications apparatuses such as modems. It is understood that communications controllers 28 and 30 can operate on an interactive basis with corresponding resources in the terminals 16 and 18 for interactive bidirectional communications between those terminals and the system 10. Communications with the devices 24 and 26 are essentially unidirectional, with the only interaction consisting of standard handshaking signals for controlling communications from the computer 12 to the devices 24 and 26.

The graphics design application and production processes in the computer 12 permit a user to design and produce a graph. Computer graphics processes are well known in the art. Examples of such constructs in an interactive form are found in FUNDAMENTALS OF INTERACTIVE COMPUTER GRAPHICS by Foley and Van Dam, Addison-Wesley, 1982. Commercial graph creation processes are also available and include the system marketed under the trademark TELLA-GRAF by the assignee of this application. In addition, the SASGRAPH system available from SAS Institute, Cary, N.C., provides interactive computer-assisted graph creation.

Figure 2:
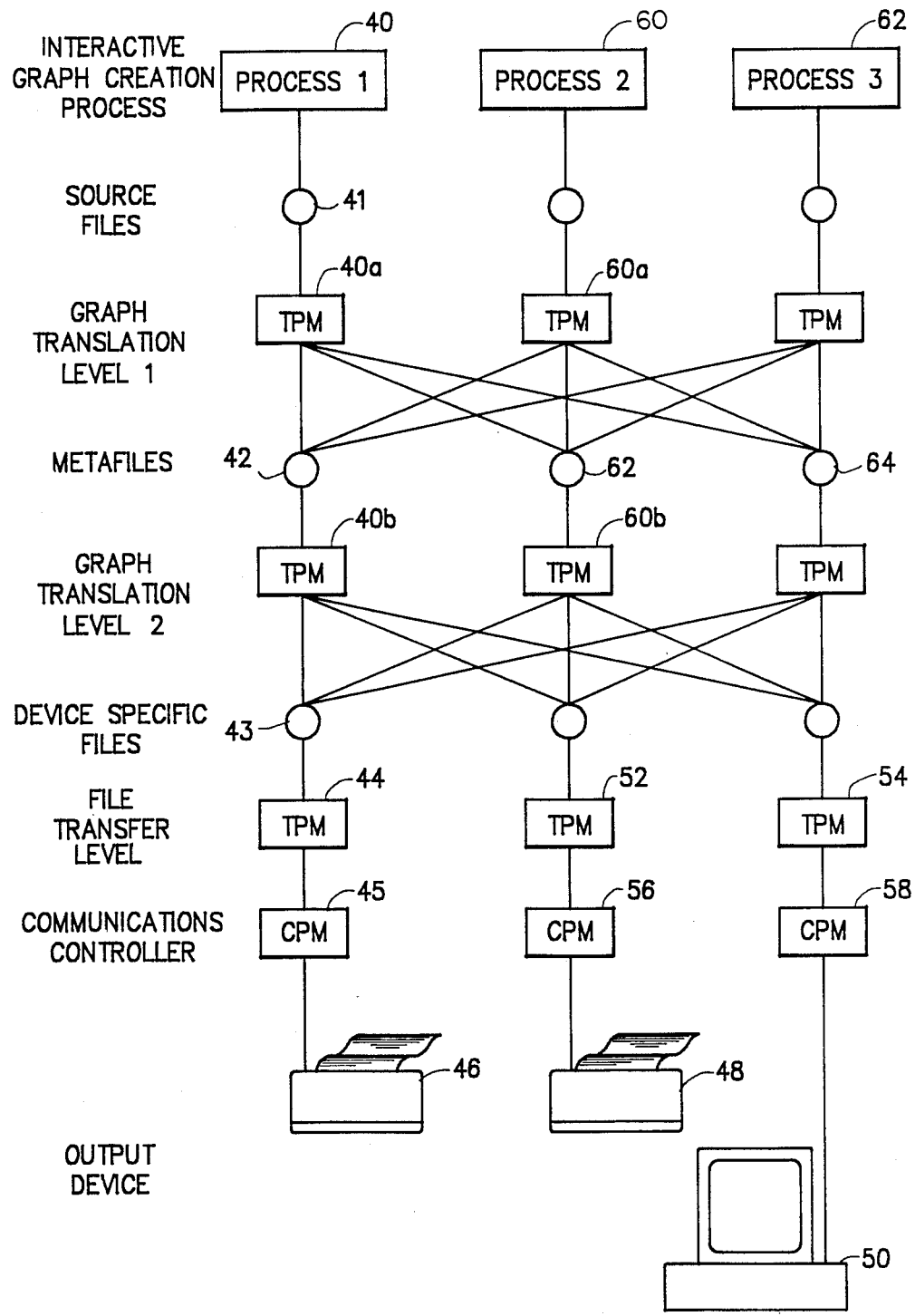
FIG. 2 illustrates the hierarchical level of graph image representations supported by the present capabilities of the computer graphics field.

A structural concept of computer graphics process systems can be understood with reference to FIG. 2. In FIG. 2 a first graph creation process, Process 1, includes processing modules 40, 40a, and 40b. The module 40 includes a graph creation process (which may or may not be interactive) invoked by a user to create a graph. The graph resulting from the process 40 is a high level source file representation 41. In turn, the source file 41 produced by process 40 is translated by a translation processing module (TPM) 40a in graph translation level 1 to a device-independent metafile 42 consisting of graphical primitives and attributes. Next, the metafile representation of a graph image is translated by another processing module 40b in graph translation level 2 to a device-specific file 43 useful only for a specific output device identified by a user. A device-specific file is translated by a particular file transfer process such as the process module 44 into a format adapted for transfer of the file to the output device 46. Transfer of the process to a user according to a particular communications protocol may require further translation of the processed file resulting from the transfer processor 44 by a communications controller 45 before the file can be transferred to the output device 46. Although not shown in FIG. 2, it is understood that the transmission from the communications controller 45 to the output device 46 may involve an intermediate transfer through an interactive terminal or may consist of direct transfer to the output device 46 initiated through a user terminal.

If the translation from source file to device-specific file occurs in one step, the metafile may not be created as a file; the information may be transferred directly from processor 40a to processor 40b. However, the information exists on the metafile level, whether placed in a file or not.

In a system comprehending a plurality of different kinds of output devices, for example, the devices 48 and 50 in addition to the device 46, dedicated file transfer processors 52 and 54 will be required to translate device-specific storage files into formats designed specifically for transmission of the files to the respective output devices 48 and 50. Communications controllers 56 and 58 may also be required for further communications for formatting of the output of the processors 52 and 54.

The proliferation of families of graph output devices has led to a corresponding expansion of specialized interactive processing systems that are designed to work with the families. In many cases the graph creation systems consist of process module hierarchies that are designed to produce graph image files only for the ultimate use of output devices of a certain family. Thus, for example, the graph creation system including the process 60 and the process modules 60a and 60b may create a hierarchy of files whose formats adhere to standards specifically designed to support the characteristics of a certain family of output devices and terminals.

However, the proliferation of output device families and supporting graph creation processes has also led to the design of graph creation systems whose processing modules can create files that satisfy the format requirements of different graph design systems. For example, the system comprising the process 40 and the process modules 40a and 40b has the ability to create device-specific files specific to different families of output devices and also intermediate-level files that are specific to other graph creation systems. For example, the TELLAGRAF graph creation system of the assignee, corresponding to the process module 40a, translates source files into metafiles that are generic to the TELLA-GRAF system as well as metafiles generic to other commercially available computer graphics systems.

Process products corresponding to the process module 40b in translation level 2 are available from the Assignee under the trademarks DISSPOP and GDFPOP. One product translates TELLAGRAF metafiles into device-specific files for many different families of output devices; the other translates the intermediate-level GDF files created by a translation level 1 process available from the International Business Machines Corporation into device specific files for IBM output devices. An IBM product GSLOAD is also available for level 1 translation of IBM product specific GDF files.

The device-specific image representations created by the translation level in the structure of FIG. 2 correspond to files known as ADMSAVE and ADMPRINT, which are used to drive IBM-family output devices. Processing of device-specific files for transfer to output devices, corresponding to the file transfer level of FIG.

2 can be done by IBM processes available under the product names FSSHOW and ADMOPUV.

It is evident therefore that computer 12 can employ available process systems for creation of graphs in the form of source files and translation of source file graphs to various levels of representational abstraction. As is known, the various level translation program modules can be called by a system user to produce various levels of representation for a created graph.

Further, the prior art includes many instantiations of data management processes that accept the graph representations created during graphics processing, enter them into a storage file format, and store the files in a storage facility such as the facility 14. Where used herein, the term graph file refers to an abstract representation of a graph formatted and stored by a data management process. In addition, the file is denoted by a modifying term corresponding to the abstraction level in which the graph is represented. Thus, "source file" refers to a storage file consisting of a source-level graph image representation.

Within the context of the invention, files of various levels of abstraction will be retrieved from the storage facility 14 and forwarded by the computer 12 to be subjected to various functions. The functions are summarized as follows: view; hardcopy; edit; and data modification. These functions are to be performed on one or more specifically-identified graphs. It is further posited that there will be a preferred representation associated with each function having to do with a quality determination made by the user.

The VIEW function consists of displaying an identified graph on a CRT terminal. The preferred representation of the graph could, for example, be a device-specific file consisting of a bit map. The reason for storing a device-specific bit map for viewing is to provide the speediest possible response to specification of the VIEW function because the requesting user will be present at the terminal upon which the graph image is to be displayed. However, it is to be understood that a higher level representation of the image can be stored, retrieved, and translated into a device-specific bit map or instruction set, without requiring production of a bit map or instruction set for storage.

The HARDCOPY function refers, for example, to production of a hard copy consisting of a graph on paper, a viewgraph transparency on some form of clear base, or 35 millimeter slide from an appropriate output device. Computer resource management policy might deem that graph image source files are most appropriate to supporting this function for the reason that a translation procedure incorporating a process that optimizes a graph layout to the particular characteristics of a selected hard copy production device operates only on source files.

Management policy might also specify that a metafile is the recommended representation to be obtained when the EDIT function is invoked by a user. As is known, graphical editors respond to user-initiated modifications input by a mouse to move, for example, line segments or text written. The only practical alternate representation would be a source file, which is easily edited simply by changing the English language statements of the file.

Finally, the DATA MODIFICATION function is most efficiently performed on the human language representation embodied in the source file. Data modification refers generally to alteration of data represented by a graph, which cannot in general be extracted from the graph primitives and attributes of a metafile or from the machine-language form of a device-specific file. For data modification then, there are no practical alternatives to the source file. Data editing can be implemented by any available process including a text editor. However, it is understood that other methods of modifying source files could be used instead of a text editor.

FIG. 3A illustrates the form of a graph directory upon which operation of the invention is based. The graph directory represented in FIG. 3A can be constructed as a standard multidimensional table that is fixed in a machine-understandable format, stored in storage that is accessible to the computer 12, and consulted whenever a user-generated function request is made for a specific graph. The directory is used in conjunction with the particular process selected for management of the graph file database created by the computer graphics processes in the computer 12. The directory can be created by the user or for the user by personnel responsible for management of the facility 10.

The graph directory represented by FIG. 3A includes a plurality of entries, each consisting of a series of consecutive fields in one dimension and, in another dimension, the representational levels into which the graph has been translated. Each table entry in its first three fields contains a unique identification (ID) of a graph, a description summarizing the graph and the information it presents, and a field or group of fields in which comments relative to the graph for its application or use and other ancillary information are stored. These initial three fields are connected by any well-known data management technique such as pointing, to another dimension containing a second group of table entry segments that are also associated with the identified graph. Each of these table entry segments includes a FILE LEVEL field specifying a level of representation into which the graph image has been rendered, a NAME field uniquely identifying the file containing the specified representation and pointing to the file's location in storage, and a DATE field indicating the last date on which the file was generated or altered.

With respect to this latter dimensional aspect of a table entry, it might be the case that a certain identified graph has source file and metafile representations. In this case the S in the FILE LEVEL field of the first table entry segment represents the source file representation, while the M in the FILE LEVEL field of the next table entry segment represents the metafile.

Reference to FIG. 3B illustrates a second table, called a Function List, available to the storage and retrieval process of the invention, which is also created and filled by a user or for a user. The FIG. 3B table represents a mapping from an invoked function to a representation selection preference in the form of a priority schedule determined by the user or by personnel responsible for management of the facility 10. It is understood that overall control of the multi-user graph system of FIG. 1 permits a user to identify an output device through invocation of a function corresponding to the device. Effectively, the FUNCTION and DEVICE fields therefore inform the computer 12 which output devices—identified by brand and model number—will perform the function. In this regard, selection by user N of the function VIEW is taken by the computer 12 to refer to production of a graph image on a specific CRT terminal. Further, the user can specify that an invoked function will result in production of a graph by more than one output device or by a specified one of a plurality of output devices. Thus, under the HARDCOPY function, for example, the user can specify that either a printer or a plotter—or both—will output the selected graph. The user will indicate in the table which device or devices are to be operated when the function is invoked. The devices on which the graphs are to be output are termed "active" devices.

The LOCATION field in the first table entry of FIG. 3B identifies the location of the output device invoked by selection of a function. This informs the computer 12 where to send a file or files retrieved in response to a user request.

The GRAPH LAYOUT field contains information relative to graph layout control parameters that optimize the production of a graph from the source level of abstraction in a layout optimized for the particular terminal.

The final field in the first table entry of FIG. 3B is a priority schedule corresponding to a graph level representation preference ordering determined by user N for the function. In the example, the priority specified for the VIEW function table entry is DS, M. This corresponds to looking first for a device. specific file (DS) of a graph to be viewed, followed by retrieval of a metafile (M) representation of the graph to be viewed if the device-specific file is not available or does not exist. It is to be understood that a user determined file class priority will be entered into the appropriate field for each table entry in the user's function list. Preferably, the first priority for each function would correspond to the resource management policy considerations discussed hereinabove with regard to description of the functions.

Figure 4:
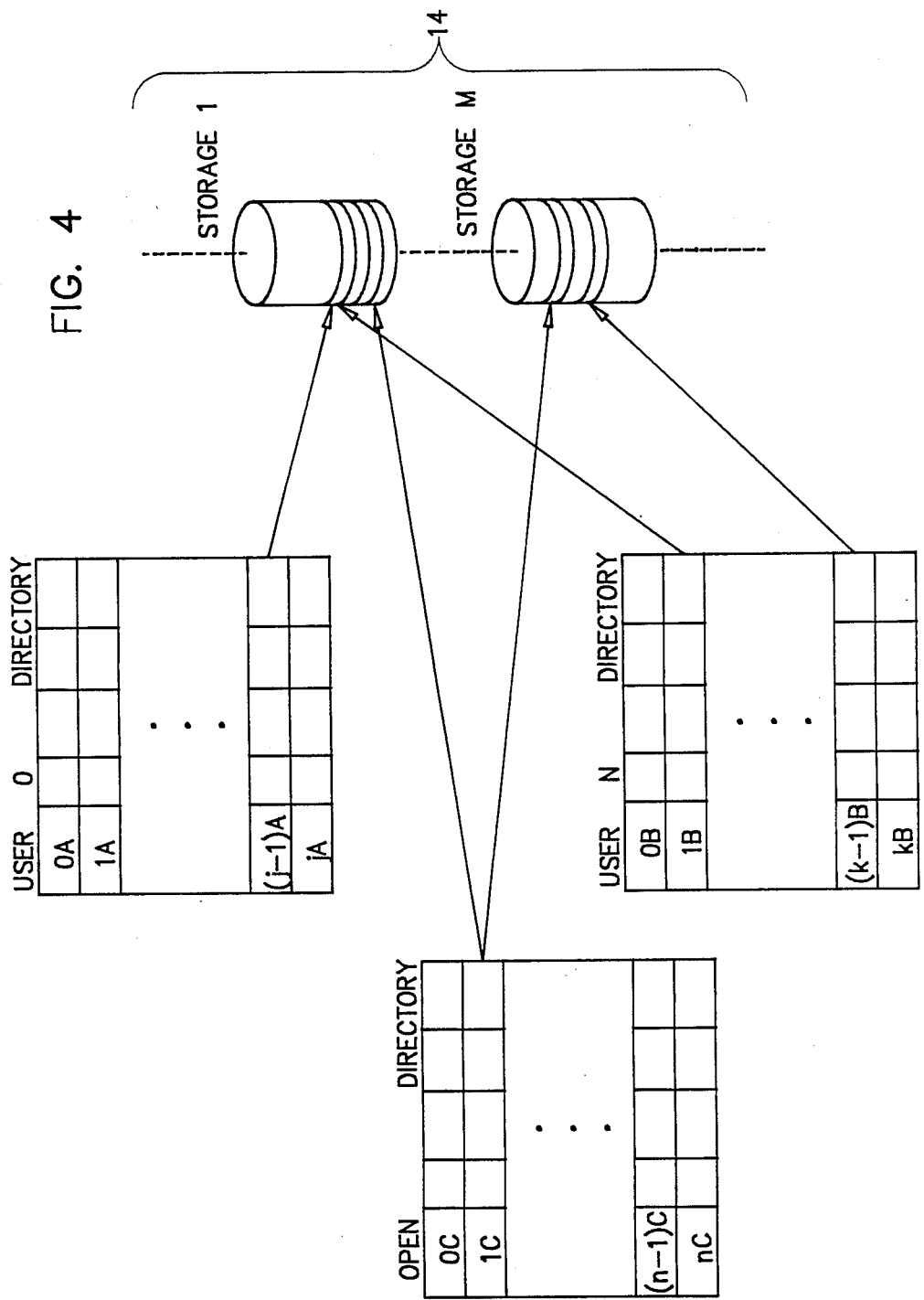
FIG. 4 illustrates how graph tables are used to access graph image file storage in the central computing facility of FIG. 1.

As shown in FIG. 4, there may exist more than one graph directory in the system of FIG. 1. For example, each user may construct his own directory and make it available only to himself or to other users qualified by him. In addition, there may be a centrally controlled open directory having entries for graphs intended to be made available to all users of the system. As shown in FIG. 4, table entries in a directory, such as the directory for user N, will point to specific locations in the storage facility 14 of the system 10 where the representations of the graph identified by the table entry are stored in files. The storage facility 14 will consist of real, virtual, on-line, or off-line storage devices or any combination of these. Thus, in FIG. 4 the storage resource 14 is shown to encompass at least two storage devices, STORAGE 1 and STORAGE M.

Figure 5:
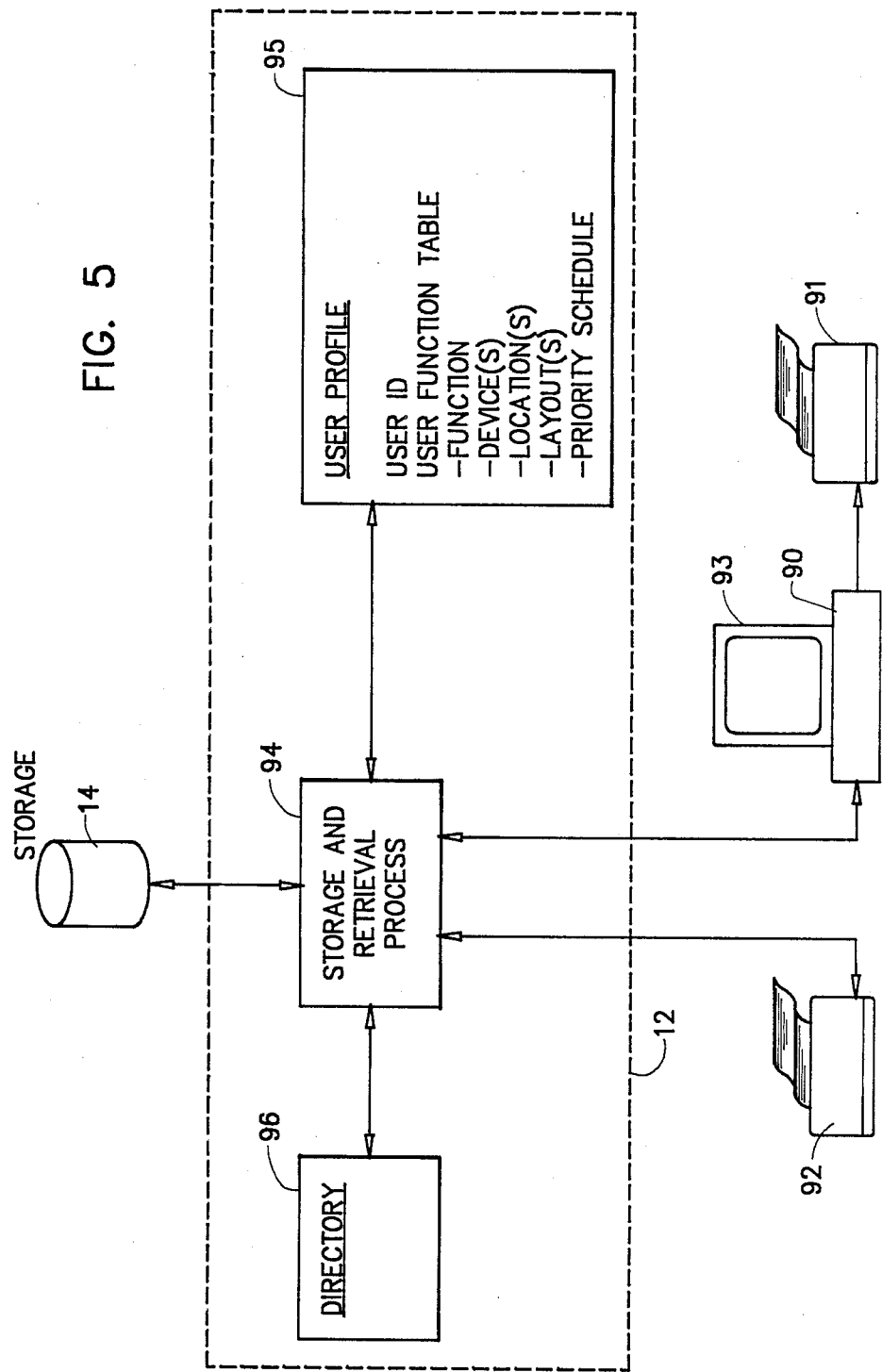
FIG. 5 illustrates the location of the retrieval process in the functional interconnection between a user terminal and the central computing facility resources.

Use of the invention in the context of FIG. 1 is represented by the diagram of FIG. 5. In FIG. 5, a user operating the terminal 90 and associated output devices 91, 92, and 93 will enter a request for retrieval of a graph to be subjected to a specified function. Both the identification of the graph and the specified function are forwarded to the central computer 12 which receives the request through the retrieval process 94. The storage and retrieval process 94 responds to the user's identification of himself to draw upon a user profile 95 available to the computer 12. The user profile corresponds essentially to an identification of the requesting user and a copy of a function list such as that illustrated in FIG. 3B.

Once the priority schedule for the indicated function is retrieved from the user profile 95, the retrieval process will consult a graph directory 96 corresponding to the directory represented by FIG. 3A. The process 94 will scan the entries in the directory 96 until it finds the table entry for the graph identified by the user. When the proper table entry is found, the process will search the FILE LEVEL fields of the located table entry to determine whether there is a match between one of the representations in the user's priority schedule for the specified function and a file created for the identified graph and stored in the storage 14. If a match is found, the process 94 will retrieve the stored representation at the file name location specified in the table entry for the first matched class according to the priority schedule, and perform whatever processing or translation is necessary to enable the specified function to be performed. This will enable the specified function to be performed. The translated file will then be forwarded to the active output device or devices at the device location or locations listed in the user profile for the devices active for the specified function.

Figure 6:
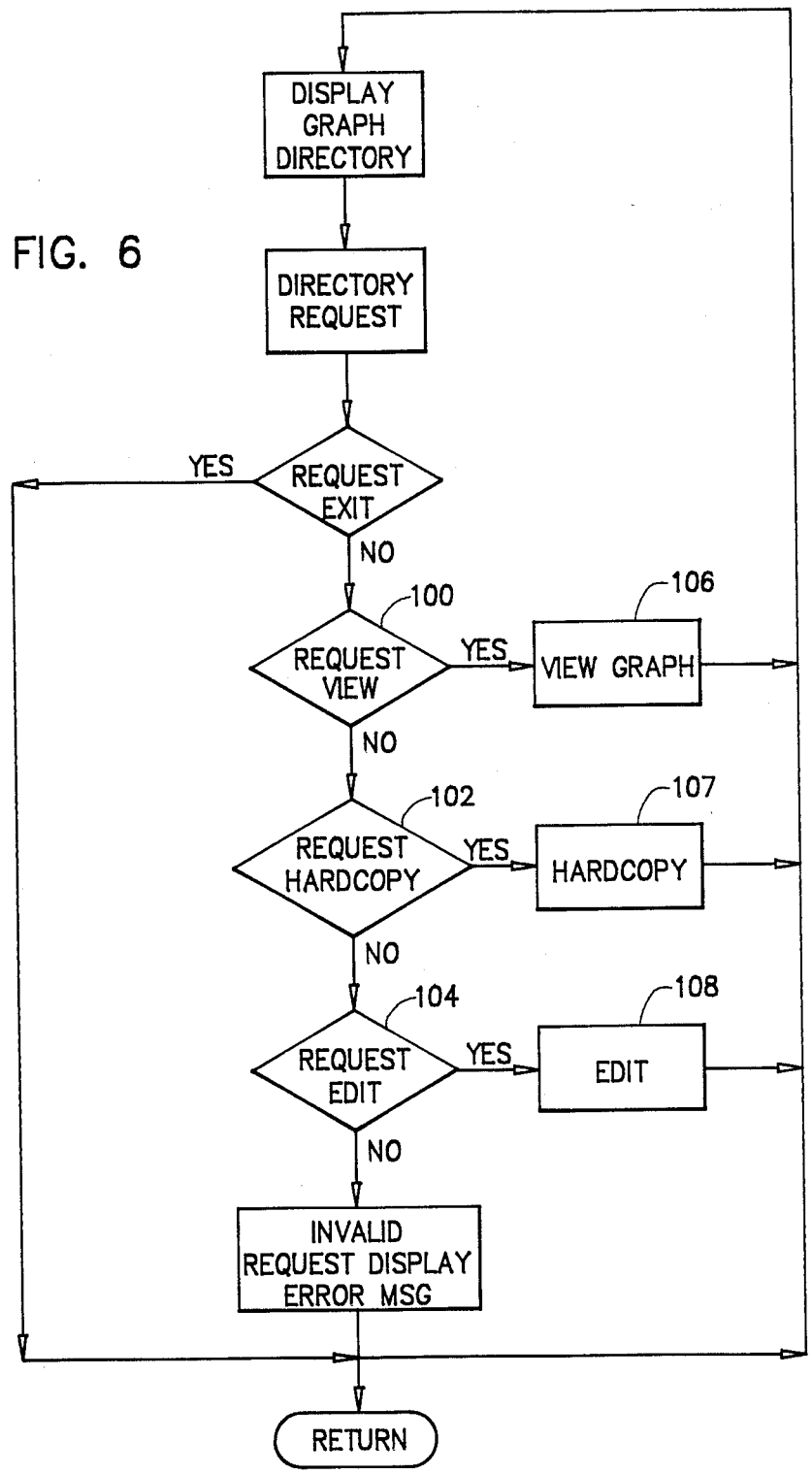
FIG. 6 is a flow chart illustrating how the retrieval process of the invention is invoked.

FIG. 6 illustrates the procedural flow for the operations described above for FIG. 5. Initially an interactive process initiated by the user at terminal 90 will result in the display on the terminal of the graph directory and the provision to the user of the opportunity to make a directory request. If the user fails to find a particular graph or decides to submit no request, he will provide an EXIT request to the computer 12, which will cause the process of FIG. 6 to follow the positive route from the EXIT decision. If, on the other hand, the user identifies an entry in the graph directory and makes a function request corresponding to one of the decisions 100 104 below the EXIT decision, the procedure will exit to the appropriate one of retrieval modules 106–108 and attempt to retrieve a file storing a representation of the identified graph at a level included in the priority schedule specified by the user. Although not shown in FIG. 6, it is understood that the DATA MODIFICATION function can also be included by a decisional retrieval module step interleaved with the decisions 100–104 and retrieval modules 106–108.

For example, assume the user has identified a graph and specified the HARDCOPY function. In FIG. 6, the process will enter the HARDCOPY decision block 102 and take a positive exit to the retrieval module 107 labelled HARDCOPY. The HARDCOPY retrieval module 107 is shown in greater detail in FIG. 7.

Figure 7:
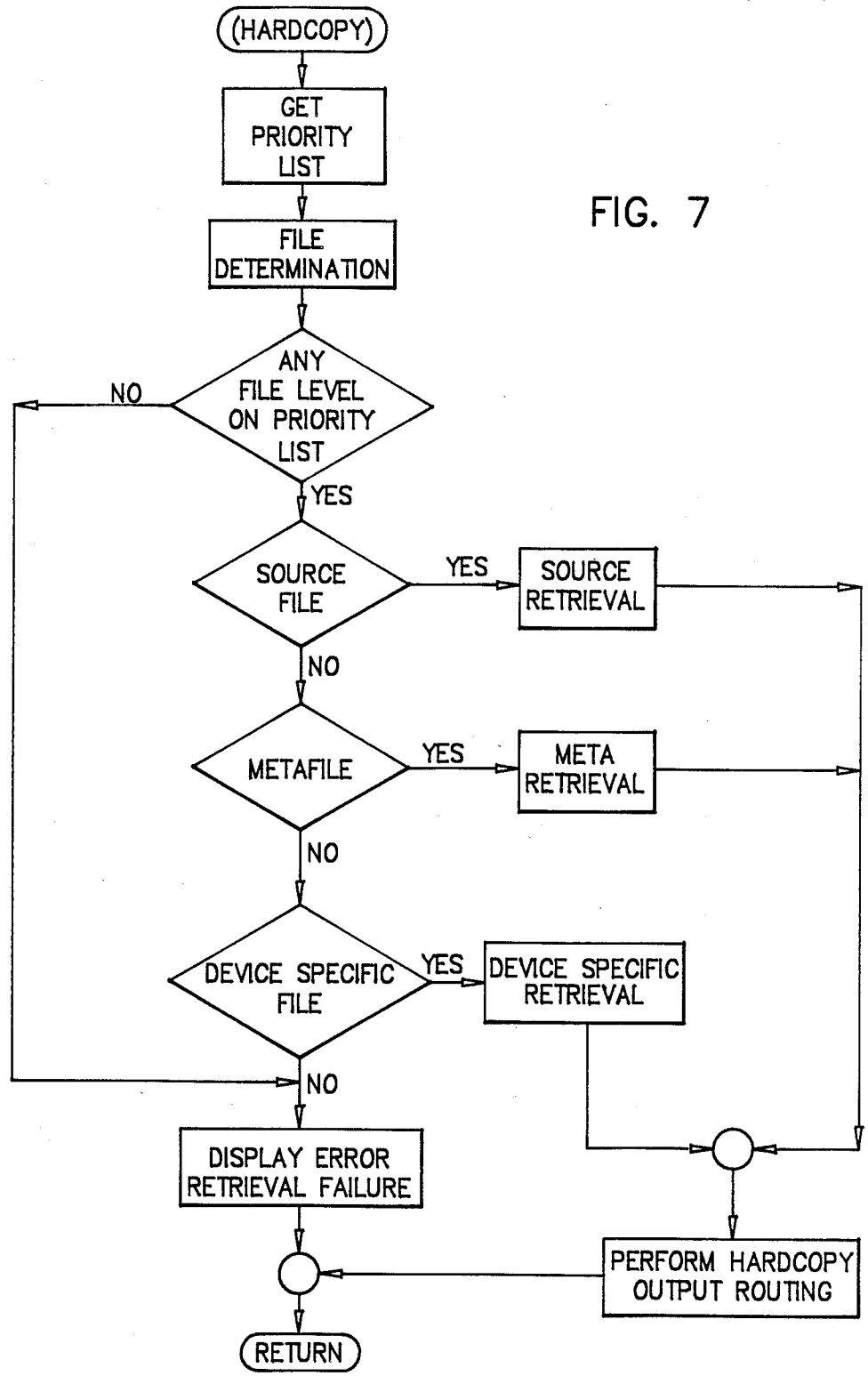
FIG. 7 is a flow chart illustrating the operation of the retrieval process.
Figure 8:
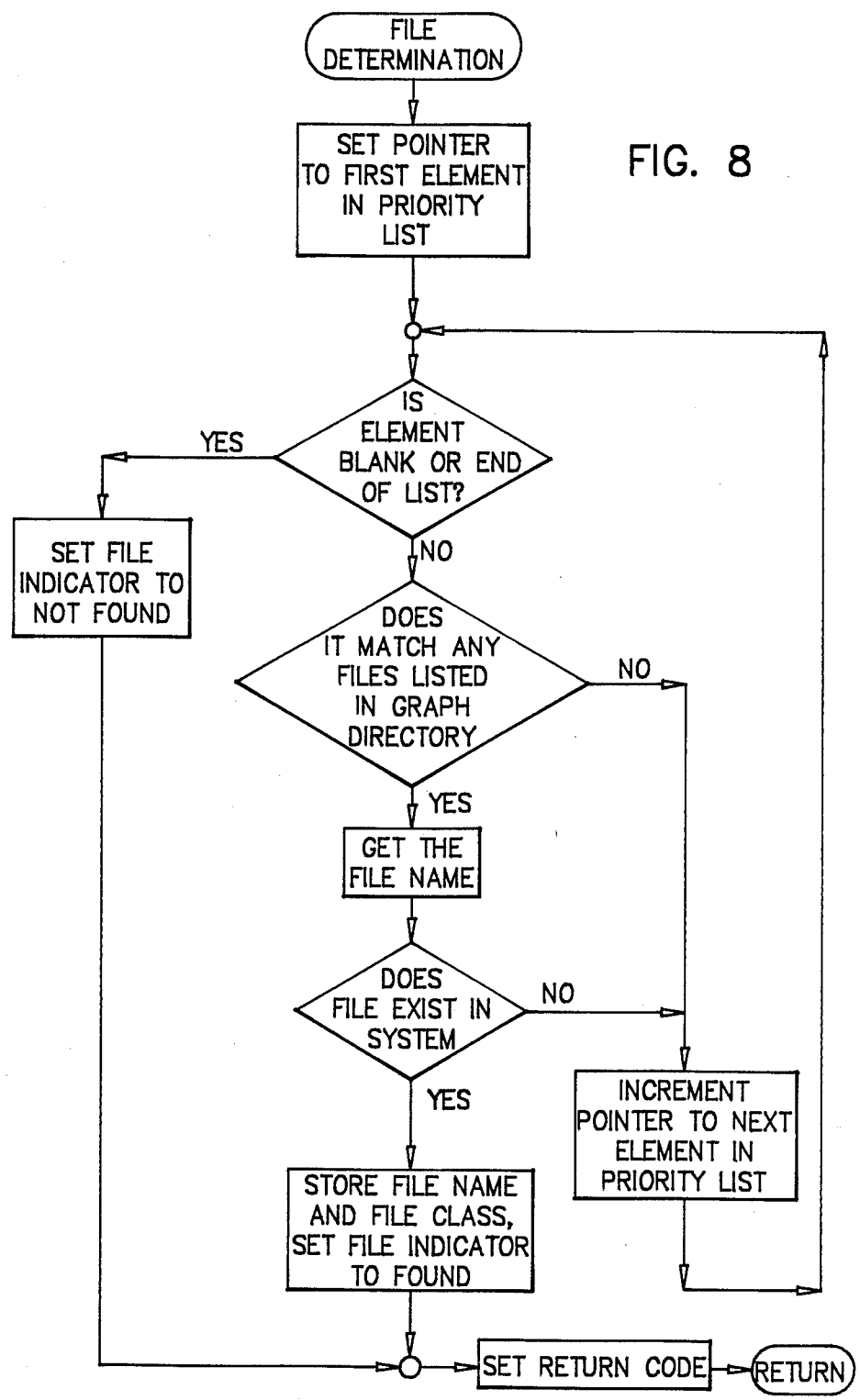
FIG. 8 is a flow chart illustrating how graph image files are searched according to a user determined priority.

In FIG. 7, the HARDCOPY retrieval module addresses the user function list to obtain the priority schedule determined by the user for the HARDCOPY function. Next, the FIG. 7 module enters the block titled FILE DETERMINATION. Refer now to FIG. 8 for the FILE DETERMINATION procedure. When the FILE DETERMINATION module of FIG. 8 is entered, the calling routine (in this example, the HARDCOPY module) has obtained from the user profile, the list of preferred file classes making up the priority schedule for the specified function (hereinafter "priority list"). The priority list is then traversed in the order determined by the user by setting a pointer to the first element of the priority list and then making a determination whether the priority list element is blank or an end of list indicator. Assuming tat the priority list element is not blank and that the FIG. 8 module has not yet traversed to the end of the priority list, the priority list element is compared against the entries in the FILE CLASS fields contained in the graph directory table entry for the identified graph. If the current priority list element matches a FILE CLASS field entry in the graph directory table entry for the identified graph, the associated file name of the graph is obtained from the FILE NAME field corresponding to the matched FILE CLASS entry. After obtaining the file name, a check is performed to see if the file exists. Assuming the file exists, the file name and file class are retained, a file indicator is set to found, and the module returns to the calling HARDCOPY process of FIG. 7. If the element in the priority list is not matched by a class listed in the graph directory table entry or if a match directory table entry file does not exist, the FIG. 8 procedure pointer is incremented to the next element in the priority list and the process is iterated. If the end of the priority list is reached without finding a match, the file indicator is set to indicate that no file has been found and the module returns to the calling HARDCOPY routine of FIG. 7.

When the FILE DETERMINATION module causes the search and retrieval process to return to the HARDCOPY function procedure of FIG. 7, the function procedure inspects the file indicator to determine whether the identified graph is contained in a file embodying a representation level in the user determined priority schedule for the specified function. If the indicator informs that a file is not found, the central system 10 returns an error retrieval message to the user through terminal 90.

Assume on the other hand that the graph exists in a level of representation specified by the user priority schedule. In this case, a retrieval procedure is called.

A retrieval procedure consists essentially of retrieval of the selected file and a determination whether the retrieved file is in the representation level that is required for the invoke function. If the retrieved file is in a representation level that is in the priority schedule, but is not that required for the device M for which the function is to be performed, the retrieval procedure calls the translation process module required to convert the retrieved representation into the required level of abstraction. Thus, if the HARDCOPY module results in retrieval of a source level file, the retrieved file will be processed for the specific device upon which the HARDCOPY function is performed. The processing can include the layout optimization described in the incorporated patent application. Once the layout optimization is completed, the optimized source file will be translated to the device-specific file necessary to drive the identified hardcopy output device. If, however, a source-level file is not found but a device-specific file exists and is included in the user's priority listing for the function, the device-specific file, without the layout optimization process, will be forwarded for operation of a specific HARDCOPY output device. The device specific file will be sent to the location indicated in the user profile for the specified device.

FIG. 7 assumes that only one hardcopy device has been specified for performance of the HARDCOPY function. If more than one hardcopy device is specified, the FIG. 7 procedure will be executed once for each device, resulting in calling a translation process module that will produce the file required for operation if the specified output device (if translation is needed) and addressing the file to the proper location.

Figure 9:
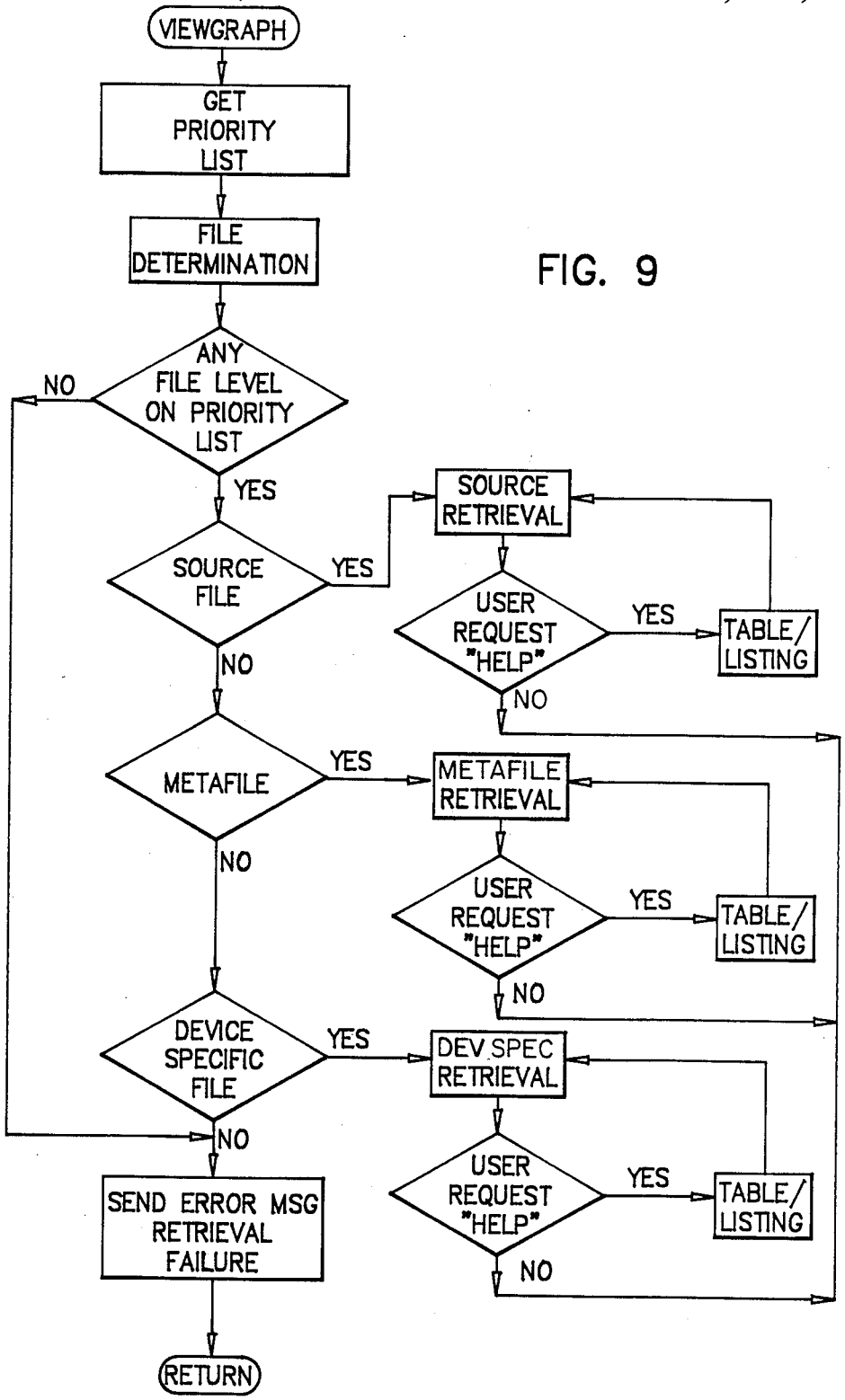
FIG. 9 illustrates the operation of the retrieval process in response to a view function selected by the user.

Reference to FIG. 9 will provide an understanding of response in the context of the invention to a user request identifying a graph and specifying the VIEW function. The request specifying the graph and the function are forwarded to the storage and retrieval process 94, which obtains the list of preferred file classes from the user profile, scans the directory to find a table entry for the requested graph, and calls the FILE DETERMINATION routine. As explained above, the FILE DE-TERMINATION routine will return a file indicator set to flag whether any of the files stored for the identified graph are contained in the preference priority of the user. After return of the FILE DETERMINATION routine, the state of the file indicator is inspected and, if no file has been produced and stored that is included in the user's preference priority, a negative branch is taken and an error message indicating retrieval failure is returned to the user. Assuming that a file meeting the user preference priority has been found, the file is retrieved, translated to device-specific bit map or instruction sequence format, formatted for communication, and forwarded to the specified device at the proper location. Each retrieval module also allows the user to invoke the well-known HELP function. If no help is requested by the user, the routine returns to the FIG. 6 routine. If HELP is invoked by the user, provision is made for a conventional software function that provides the user with the ability to obtain information relating to various aspects of the graph represented by the retrieved file and to the use of the system.

Figure 10:
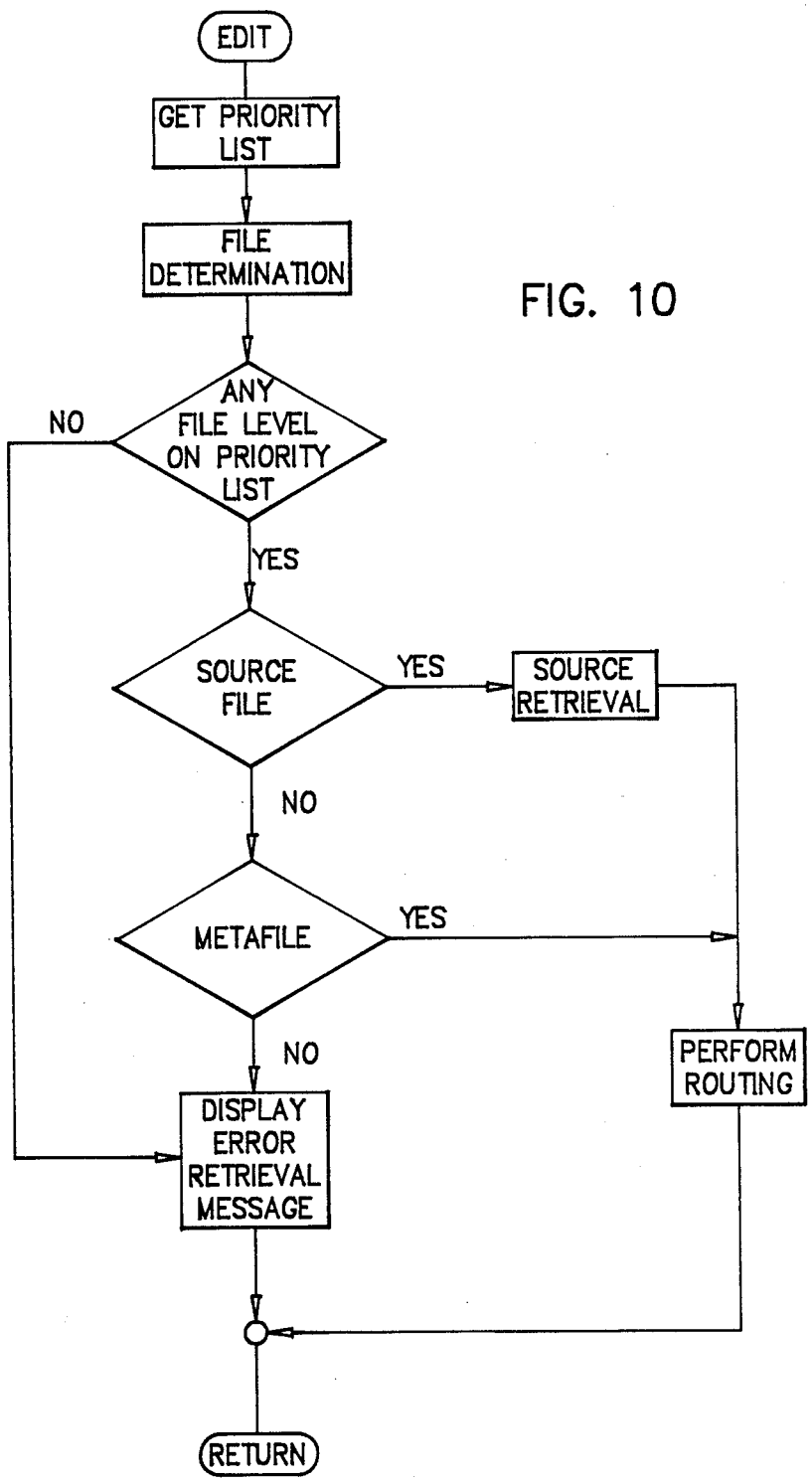
FIG. 10 illustrates the operation of the retrieval process in response to a graph modification function selected by a user.

The EDIT function procedure, illustrated in FIG. 10, is normally invoked to permit a user to alter a graph by using a mouse or other device to operate a graphics editor. As is known, a graphics editor conventionally operates on an intermediate level representation such as a metafile. When a graph is identified in the EDIT function invoked, the FILE DETERMINATION routine is followed. In this case, the user's priority schedule would include source and metafile level entries, with metafile representations being required for function performance.

It should be evident that FIG. 10 is also representative of the DATA MODIFICATION function. In this case, of course, only source files—human readable representation of graphs would be retrieved and forwarded. Therefore, the invention is not necessarily limited to the practice of the EDIT function illustrated in FIG. 10.

Graph files, graph directories, and function tables may be shared or centralized to varying degrees, without materially affecting the method or means of the invention. Thus, the graph files and directories may be shared among many users. Function ordering can be either user determined or ordained by the policy of an organization managing a system including the invention. Finally, for each table, profile, or directory that is alterable by a user, there can be a default priority schedule maintained in a central system area.

Further, the different file image representations may be stored in some storage format other than simple files. This may change the mechanism for storing and retrieving an image, and may affect performance, reliability, security and other characteristics of the process, but it will not materially affect the operation or benefits of the invention.

Graph representations other than those here described may also be used. As long as there is a processor capable of translating a representation, and there are benefits of the representation that would lead a user to include it on his priority schedule, the invention would not be materially altered.

Functions other than those described here may be available for application on the graph image. Different functions would not materially affect the operation or benefits of the invention as long as there is a processor capable of performing the function and at least one representation to support the processor.

The storage and retrieval method and system of the invention can include or be included in other functions, such as linked graphs, hierarchical, network, or other directory structures, searches of the directory based on data contents, exception flags, data currency, key words, or retrieval of several graphs at once. These functions would be complementary to the invention and would not affect its merits or performance as long as the basic function of identifying a graph and applying a certain function to it remained.

Obviously many modifications and variations of the above described invention are possible in light of these teachings. It is therefore to be understood that within the scope of the following claims, the invention may be practiced otherwise than as specifically described.

We claim:

1. A method for retrieving stored graphical representations in a system including a central computing facility with storage, processes in the computing facility for creating graph representations in response to user-provided specifications, processes for translating created graph representations, and processes for storing graph representation files, a plurality of user terminal facilities communicatively linked to exchange data with the computing facility, and a plurality of graph output devices communicatively linked to the computer and responsive to graph representations for producing visible images of graphs, the method comprising the steps of:
   creating a graph representation in source file format;
   producing specified graph files of created graphs in predetermined levels of machine readable expressions by translating source files;
   tabularizing and storing graph files by table entries, each of the table entries including identification of a specific graph and a listing of graph files produced and stored for the identified graph;
   receiving user-generated requests which identify graphs and specify machine output functions or modification functions to which an identified graph is to be subjected; and
   searching to find a table entry corresponding to the requested graph, and, if the entry is found, searching the listing of graph files in the found entry according to a predetermined priority schedule to determine whether a specified output function can be performed using any of the stored graph files.

2. The method of claim 1 further including, after said step of searching and if a produced graph file is included in the priority schedule, the steps of retrieving the graph file, translating the graph file to a preferred level of representation, and forwarding the translated graph file to one or more output devices prespecified by the user.

3. The method of claim 2 wherein said output function includes producing a copy of a graph on a hardcopy output device.

4. The method of claim 2 wherein said output function includes producing a copy of a graph on a terminal display.

5. The method of claim 2 wherein said modification function includes altering data in a graph file.

6. The method of claim 2 wherein said modification includes altering the graph representation.

7. A system for retrieving stored graphical representations, comprising:
   a computer with storage and including processes for creating source file graph representations in response to user-provided specifications, processes for producing specified graph files of created graphs in predetermined levels of machine readable expressions by translating source representations and processes for storing graph representation files;
   a plurality of user terminals communicatively linked to the computer for providing user-initiated graph creation specifications and for providing user-initiated requests which identify graphs and specify machine output or modification functions to which an identified graph is to be subjected;
   a plurality of graph output devices communicatively linked to the computer for performing graph machine output or modification functions in response to graph representations received from the computer; and
   retrieval process means in the computer for tabularizing and storing graph files by table entries, each of the table entries corresponding to a respective created graph and listing graph files produced and stored for the respective graph and responsive to user-generated requests which identify graphs and specify machine output or modification functions to which the identified graph is to be subjected for searching to find a table entry corresponding to the identified graph and, if the entry is found, searching the listing of graph files in the found entry according to a predetermined priority schedule to determine whether a specified function can be performed using any of the listed graph files.

8. The system of claim 7, wherein the retrieval process means further includes means for retrieving the graph file, translating the graph file into a preferred level of representation indicated by the priority schedule, and forwarding the translated graph file to one or more specified output devices, if a produced graph file is included in the priority schedule.

9. The system of claim 7 wherein the graph representations and graph entry tabularizations are stored in a database management system and its associated directory.

10. The system of claim 7 wherein the priority schedule is predetermined by a centralized system maintenance staff.

11. The system of claim 7 wherein the priority schedule is user-determined.

12. The system of claim 7 wherein stored graph representations and associated entry tabularizations are shared among all users or groups of users of a computer facility.

* * * * *